_United States Patent Office_

3,793,403
Patented Feb. 19, 1974

3,793,403
METHOD OF PRODUCING ABS TYPE POLYBLEND UTILIZING AGGLOMERATED RUBBER SUBSTRATE OF RELATIVELY MONODISPERSE PARTICLE SIZE AND POLY-BLENDS PRODUCED THEREBY
William O. Dalton, Hampden, and Quirino A. Trementozzi, Springfield, Mass., assignors to Monsanto Company, St. Louis, Mo.
No Drawing. Continuation-in-part of abandoned application Ser. No. 48,564, June 22, 1970. This application Nov. 3, 1971, Ser. No. 195,444
Int. Cl. C08f 37/18, 41/12
U.S. Cl. 260—876 R
12 Claims

ABSTRACT OF THE DISCLOSURE

A polyblend contains a matrix interpolymer of monovinylidene aromatic hydrocarbon and an ethyleneically unsaturated nitrile, and a graft copolymer having a superstrate of an interpolymer of monovinylidene aromatic hydrocarbon and an ethylenically unsaturated nitrile. In the graft copolymer, the substrate comprises an agglomerated rubbery polymer having a monodisperse particle size, and both the molecular weight of the superstrate and also the ratio of superstrate to substrate are carefully controlled to provide an optimum balance of properties in the polyblend.

CROSS-REFERENCE TO RELATED APPLICATION

The present application is a continuation-in-part of our copending application, Ser. No. 48,564, filed June 22, 1970 bearing the same titled and now abandoned.

BACKGROUND OF THE INVENTION

As is well known, polyblends of rubber with styrene-acrylonitrile type interpolymers are advantageous in providing compositions which exhibit desirable properties, including especially toughness, chemical resistance and good formability. A number of techniques have been explored for increasing toughness, the most common approach being to increase the level of rubber or the size of the rubber particle, both of which tend to adversely affect gloss and surface characteristics as well as the balance of other properties. Previously, it has been proposed to utilize rubber particles of an average size in the range of 0.2–0.4 micron in an effort to improve impact properties without undue effect upon gloss and surface properties. However, generally rubber latices have a broad particle size distribution which has now been found to provide difficulties in achieving an optimum balance of properties.

Accordingly, it is an object of the present invention to provide a novel polyblend of rubber with an interpolymer consisting at least principally of a monovinylidene aromatic hydrocarbon and an ethylenically unsaturated nitrile, which exhibits a highly desirable balance of properties.

It is also an object to provide such a polyblend which has high impact resistance and good surface characteristics, and in which other desirable properties are maintained or improved.

Another object is to provide a facile and relatively economical process for preparing such rubber-interpolymer polyblends, which permits utilization of existing equipment and techniques for the preparation thereof.

SUMMARY OF THE DISCLOSURE

It has now been found that the foregoing and related objects can be readily attained in a method of making a polyblend comprising first polymerizing an emulsified diene monomer formulation to obtain a latex of rubbery polymer having a weight average particle size of less than 0.15 micron. The rubbery polymer of the latex is thereafter agglomerated to produce a latex of a rubber substrate having a weight average particle size within the range of about 0.35–0.70 micron and wherein the particles are substantially monodisperse in size with at least about 70.0 percent by weight being within 0.05 micron of the weight average size thereof. Finally, about 100–250 parts per 100 parts of rubbery polymer of a polymerizable monomer formulation consisting at least principally of a monovinylidene aromatic hydrocarbon and an ethylenically unsaturated nitrile is polymerized in the presence of the agglomerated rubber as essentially the sole rubber component and a molecular weight regulator. The conditions of polymerization and the amount of molecular weight regulator are such as to produce grafting of a part of the monomer formulation onto the rubber substrate to provide $15\text{--}45 \times 10^{-7}$ gram of superstrate per square centimeter of substrate surface when the substrate is of a particle size of about 0.35–0.50 micron and about 40 to $70 \times 10^{-7}$ gram of superstrate per square centimeter of substrate surface when the substrate is of a particle size of about 0.50–0.70 micron. The polymerization conditions are also selected to produce an interpolymer from the monomer formulation having a molecular weight represented by an intrinsic viscosity of 0.35–0.60 in dimethylformamide at 25° centigrade.

In the preferred embodiments, the monovinylidene aromatic hydrocarbon is styrene, the unsaturated nitrile is acrylonitrile, and the diene monomer formulation contains at least 75 percent by weight butadiene; most desirably, the diene monomer formulation comprises butadiene and acrylonitrile. The rubbery polymer is preferably agglomerated by addition of a water-soluble organic acid anhydride thereto, and the molecular weight regulator is desirably present in an amount of about 1.0–1.5 moles per 100 moles of polymerizable monomer formulation.

The composition produced comprises a polyblend of a matrix of an interpolymer consisting at least principally of a monovinylidene aromatic hydrocarbon and an ethylenically unsaturated nitrile, and a graft copolymer therewithin. The graft copolymer has a graftable rubber substrate containing a diene monomer component, and a superstrate of an interpolymer consisting at least principally of a monovinylidene aromatic hydrocarbon and an ethylenically unsaturated nitrile. The rubber substrate has a weight average particle size within the range 0.35–0.70 micron, and the particles thereof are substantially monodisperse in size; i.e., at least about 70.0 weight percent of the particles lie within 0.05 micron of the weight average size thereof. In the graft copolymer, about $15\text{--}45 \times 10^{-7}$ gram and $40\text{--}70 \times 10^{-7}$ gram, of superstrate is present per square centimeter of substrate surface, when the substrate particles are of a size of about 0.35–0.50 and 0.50–0.70 micron respectively. The molecular weight of the interpolymer formed by the graft polymerization is represented by an intrinsic viscosity of 0.35–0.60 in dimethylformamide at 25° centigrade.

The particle size of the substrate may be determined by various techniques which will not affect the size thereof by swelling, agglomerating, shrinkage or the like. Most conveniently, the size of the agglomerated rubber substrate is determined prior to grafting in the agglomerated aqueous latex using turbidometric techniques or by counting and measuring of electron photomicrographs of a thin film thereof. Alternatively, particle size may be determined in the graft polyblend by use of electron photomicrographic analysis of specimens stained with the osminum oxide in accordance with the technique described by K. Kato in 9 Polymer, 419, 225 (1968).

DETAILED DESCRIPTION OF THE PREFERRED EMBODIMENTS

As has been pointed out previously, the process of present invention requires graftable rubber substrates and vinylidene monomer formulations. In addition, a molecular weight regulator is generally required, and various other additives may be utilized to obtain the desired results. These various components will be discussed hereinafter in detail.

The rubber substrate

Various rubbers onto which the monomers may be grafted during the polymerization in the presence thereof are utilizable as the substrate of the graft copolymers, including conjugated 1,3-diene rubbers, ethylene-propylene-diene terploymer rubbers, acrylate-diene interpolymer rubbers, and mixtures thereof. In any event, it is important that the rubbery polymer employed have a weight average particle size less than 0.15 micron, and preferably between 0.05 and 0.15 micron in diameter; normally, the rubber particles will lie predominantly within the range of 0.05–0.08 micron. Although saturated rubbers may be grafted, it has been found desirable to include at least a small amount (at least 1.0 percent by weight) of a diene monomer component such as butadiene, hexadiene or octadiene to facilitate grafting thereof. This diene monomer component will normally comprise 1 to 20 percent by weight and preferably 2 to 8 percent by weight of the ethylene/propylene/diene terpolymer or acrylate copolymer rubber.

The preferred rubbers are diene rubbers or mixtures of diene rubbers, i.e., any rubbery polymers (a polymer having a second order transition temperature not higher than —20° centigrade, as determined by ASTM Test D–746–52T) of one or more conjugated 1,3-dienes, e.g. butadiene, isoprene, piperylene, chloroprene, etc. Such rubbers include homopolymers of conjugated 1,3-dienes and interpolymers of such 1,3-dienes with up to an equal amount by weight of one or more copolymerizable monoethylenically unsaturated monomers, such as monovinylidene aromatic hydrocarbons (e.g., styrene; an aralkylstyrene such as the o- m-, and p-methylstyrenes, 2,4-dimethylstyrene, ar-ethylstyrenes, p-tert-butylstyrene, etc.; and alpha-alkylstyrene, such as alphamethylstyrene, alpha-ethylstyrene, alpha-methyl-n-methylstyrene, etc.; vinyl naphthalene, etc.); arhalo monovinylidene aromatic hydrocarbons (e.g., the o-, m-, and p-chlorostyrenes, 2,4-dibromostyrene, 2-methyl-1,4-chlorostyrene, etc.); acrylonitrile; methacrylonitrile; alkyl acrylates (e.g., methyl acrylate, butylacrylate, 2-ethylhexyl acrylate, etc.), the corresponding alkyl methacrylates; acrylamides (e.g., acrylamide, methacrylamide, N-butyl acrylamide, etc.); unsaturated ketones (e.g., vinyl methyl ketone, methyl isopropenyl ketone, etc.); alphaolefins (e.g., ethyl, propylene, etc.); pyridines; vinyl esters (e.g., vinyl acetate, vinyl stearate, etc.); vinyl and vinylidene halides (e.g., the vinyl and vinylidene chlorides and bromides, etc.); and the like.

Although the rubber may contain up to about 2 percent of a crosslinking agent, based on the weight of the rubber-forming monomer or monomers, excessive cross-linking can result in loss of the rubbery characteristics. However, cross-linking of the rubber graft is desirable to preserve proper morphology of the particles thus produced. Accordingly, some cross-linking during the grafting reaction is advantageous and inherent cross-linking can be further encouraged through the variation of graft polymerization conditions as is well known in the art. Thus, rubber graft particles of spherical form and proper size may be obtained and maintained even during mechanical processing to achieve the desired dispersion thereof in the rigid matrix when such a technique is employed. The cross-linking agent can be any of the agents conventionally employed for cross-linking diene rubbers, e.g., divinylbenzene, diallyl maleate, diallyl fumarate, diallyl adipate, allyl acrylate, allyl methacrylate, diacrylates and dimethacrylates of polyhydric alcohols, e.g., ethylene glycol dimethacrylate, etc.

A preferred group of rubbers are those consisting essentially of 75 to 100 percent by weight of butadiene and/or isoprene and up to 25 percent by weight of a monomer selected from the group consisting of monovinylidene aromatic hydrocarbons (e.g., styrene) and unsaturated nitriles (e.g., acrylonitrile), or mixtures thereof. Particularly advantageous substrates are homopolybutadiene and copolymers of 90 to 95 percent by weight butadiene with 5 to 10 percent by weight of acrylonitrile or styrene, and most desirably the comonomer is acrylonitrile.

Agglomeration of the rubber latex

As has been indicated, a latex of a rubbery polymer having a particle size of less than 0.15 micron (weight average) is agglomerated to provide an agglomerate particle size of 0.35–0.70 and preferably 0.4–0.6 micron (weight average). In addition, to function satisfactorily the agglomerated particles must be substantially "monodisperse" in size, by which term is meant that at least 70.0 percent by weight of the agglomerated particles must be within 0.05 micron of the weight average size thereof. Although various techniques have been proposed and utilized for the agglomeratoin of rubber latices, including freeze-thaw, acidulation, and shear or pressure agglomeration (the last technique being the subject of British Pats. Nos. 976,212, 976,213 and 976,214), the process of agglomeration that is preferred for use in accordance with this invention utilizes the high advantageous acidulation technique of Dalton U.S. Pat. 3,558,541.

In the Dalton process, an organic acid anhydride is added to a rubber latex that utilizes as the emulsifier a soap or salt of an organic acid having an ionization constant lower than that of the acid of the anhydride. The hydride is dispersed before substntial hydrolysis occurs, and the mixture is then allowed to stand with minimal agitation until the anhydride hydrolyzes and produces free acid, which in turn attacks the emulsifying agent to cause agglomeration of the rubber particles. Substantial agitation during this portion of the process is avoided to prevent coagulation. After the desired particle size has been attained, the latex is stabilized by the addition of an acid-stable emulsifying agent or by the regeneration of the fatty acid soap through the addition of a basic compound such as the alkali metal hydroxides.

Preferably acetic acid anhydride is employed, although maleic and propionic acid anhydrides have also been used advantageously. Generally, the amount of anhydride employed will be at least one-tenth the stoichiometric equivalent of the emulsifying agent (providing a molar ratio of 1:20 since there are two acid radicals). Normally, the amount employed is at least one-fourth the stoichiometric equivalent and preferably the amount added is in excess of the stoichiometric amount of the emulsifying agent. Amounts in excess of five times the equivalent provide no additional benefit and may interfere with the stability of the agglomerated latex, or with the properties of the polymer by introducing excessive acidity or corrosive action.

The time for agglomeration will vary with the temperature of treatment, the concentrations of anhydride and emulsifying agent, the rate of hydrolysis of the anhydride, the nature of the rubbery polymer, the initial and desired sizes of the particles, etc. Periods of five minutes to ten hours may be employed, with times of about five minutes to two hours being normal at ambient temperatures.

After agglomeration reaction has taken place, the latex is generally stabilized by the addition of an acid stable emulsifier or by the regeneration of the initial soap emulsifier by the addition of a basic compound to neutralize the acid and provide an alkaline pH. Anionic emulsifying agents such as alkali metal salts of long chain sulfonic acids and non-ionic emulsifying agents such as ethoxylated octyl phenol have been employed successfully. An alkali metal hydroxide or other basic compound such as a carbonate may be added to regenerate the fatty acid soap; the amount added will normally be at least the stoichiometric equivalent of the acid anhydride although lesser amounts may be employed with some lessening in stability of the latex.

Further information considering this highly advantageous agglomeration process may be found in the aforementioned patent of William O. Dalton. In addition, the agglomerating effect of the acid anhydride may be potentiated by the prior addition to the latex of an inorganic electrolyte such as an alkali metal halide. This procedure is described in Dalton U.S. Pat. 3,551,370. A characteristic of the Dalton process is the monodisperse nature of the rubber latices as formed, i.e., the narrow particle size distribution. This avoids the need for any secondary technique of classification and separation to obtain the monodisperse particle size required herein.

Polymerizable vinylidene monomer formulations

The polymerizable monomer formulation will, of course, contain the monomers to be polymerized, initiator where required, and other desirable components such as stabilizers, molecular weight regulators, etc. Although the specific monomers will vary with the desired product and the composition of the polymerizable formulation may vary widely, the process is highly advantageously employed in the manufacture of styrene-acrylonitrile type polyblends. In such a case, styrene and acrylonitrile-type monomers are employed jointly in the polymerization formulation to produce a product of the type known as "ABS."

Exemplary of the monovinylidene aromatic monomers that may be interpolymerized are styrene; alpha-alkyl monovinylidene mono-aromatic compounds, e.g., alpha-methylstyrene, alpha-ethylstyrene, alpha-methylvinyltoluene, alpha-methyl dialkylstyrene, etc.; ring-substituted alkyl styrene, e.g., vinyl toluene, o-ethylstyrene, p-ethylstyrene, 2,4-dimethylstyrene, etc.; ring-substituted halostyrenes, e.g., o-chlorostyrene, p-chlorostyrene, o-bromostyrene, 2,4-dichlorostyrene, etc.; ring-alkyl, ring-halo-substituted styrenes, e.g., 2-chloro-4-methylstyrene, 2,6-dichloro-4-methylstyrene, etc.; vinyl naphthalene; vinyl anthracene, etc. The alkyl substituents generally have one to four carbon atoms and may include isopropyl and isobutyl groups. If so desired, mixtures of such monovinylidene aromatic monomers may be employed.

Exemplary of the ethylenically unsaturated nitriles that may be interpolymerized with monovinylidene aromatic monomers are acrylonitrile, methacrylonitrile, ethacrylonitrile and mixtures thereof. Other monomers that may be included in the vinylidene monomer formulations are the conjugated 1,3-dienes, e.g., butadiene, isoprene, etc.; alpha- or beta-unsaturated monobasic acids and derivatives thereof, e.g., acrylic acid, methyl acrylate, ethyl acrylate, butyl acrylate, 2-ethylhexyl acrylate, methacrylic acid and the corresponding esters thereof; acrylamide, methacrylamide; vinyl esters such as vinyl acetate, vinyl propionate, etc.; dialkyl maleates or fumarates such as dimethyl maleate, diethyl maleate, dibutyl maleate, the corresponding fumarates, etc. As is known in the art, the amount of various of the foregoing materials useful as comonomers in an interpolymer will vary.

The vinylidene monomer formulations of the present invention consist at least principally of a monovinylidene aromatic hydrocarbon and an ethylenically unsaturated nitrile, i.e., such monomers comprise at least 50.0 percent by weight and preferably at least 75.0 percent by weight of the formulation. Most desirably, such monomers comprise at least 90.0 percent by weight of the formulation and the usual commercial compositions are substantially completely comprised of such monomers although minor amounts, i.e., less that 5.0 percent by weight, of other components such as chain transfer agents, modifiers etc., may be included.

These preferred polymerizable monomer mixtures contain at least 10 percent by weight of the monovinylidene aromatic hydrocarbon monomer and preferably at least 50 percent by weight thereof. They also contain at least 5 percent by weight of the unsaturated nitrile and preferably at least 10 percent by weight thereof. From the standpoint of highly advantageous commercial practice, to produce advantageous ABS products, the monomer formulations contain 20 to 95 percent, and preferably 60 to 85 percent, by weight of the monovinylidene aromatic hydrocarbon and 80 to 5 percent, and preferably 40 to 15 percent, by weight of the unsaturated nitrile.

Graft polymerization process

The graft copolymer is prepared by polymerizing the monomer formulation in the presence of the preformed, agglomerated rubber substrate, generally in accordance with conventional graft polymerization techniques. In graft polymerization, the preformed rubbery polymer substrate generally is admixed with the monomer and this admixture is polymerized to combine chemically or graft at least a portion of the polymer upon the rubber substrate. Depending upon the ratio of monomers to rubbery substrate and polymerization conditions, it is possible to produce both the desired degree of grafting of the polymer onto the rubbery substrate and the polymerization of ungrafted polymer to provide the desired amount of matrix polymer at the same time. Normally, the ratio of monomers to rubber charged ot the graft polymerization reaction is the primary determinant of the superstrate:substrate ratio of the resultant graft copolymer. However, conditions of polymerization, rubber chemistry and particle size, rates of monomer addition, chain transfer agents, etc., also exert an effect.

The initiator or catalyst is generally included within the range of 0.01 to 2.0 percent by weight, and preferably on the order of 0.1 to 1.0 percent by weight of the polymerizable monomer, depending upon the monomers and the desired polymerization cycle. As will be discussed more fully hereinafter, the initiator may be added incrementally to facilitate optimum grafting.

It is significant that the grafting reaction is controlled to produce a graft superstrate having a molecular weight corresponding to an intrinsic viscosity of 0.35–0.60 as measured at 25° centigrade in dimethylformamide, since there is a strong correlation between polyblend properties and this value. Such control may be accomplished by temperature control alone during the grafting reaction; however, it is generally desirable to incorporate a conventional molecular weight regulator such as the mercaptans, halides and terpenes (e.g., n-dodecyl mercaptan, tert-dodecyl mercaptan, terpinolene), in relatively small percentages by weight. Normally the combined effects of such regulators and temperature will be relied upon for molecular weight control. When used, the percentage of molecular weight regulator will be on the order of 0.001 to 2.5 percent by weight of the polymerizable monomer, depending upon the particular regulator involved. Thus, when terpinolene is employed for this purpose about 0.5–2.0, and preferably 1.0–1.5 mole percent (based upon the monomer formulation) thereof, and a temperature of about 20° to 100° centigrade produce desirable results, and it has been observed that intrinsic viscosity decreases by about 0.05 dcl./g. as the terpinolene level increases. In addition, it may be desirable to include relatively small amounts of antioxidants or stabilizers such as the conventional alkylated phenols, although these may be added during or after polymerization.

In preferred emulsion polymerization process, the monomer formulation and an agglomerated rubber substrate latex are emulsified in water by use of a suitable emulsifying agent, such as a fatty acid soap, an alkali metal or ammonium soap of a high molecular weight alkyl or alkaryl sulfate or sulfonate etc. Emulsifying agents which have proven particularly advantageous are sodium oleate, sodium palmitate, sodium stearate and other sodium soaps when operating at neutral to alkaline pH. Generally, the emulsifying agent is provided in total amounts of about 0.1 to 8.0 parts by weight per 100 parts by weight of the monomer formulation, and water is provided in an amount of about 1.0 to 4.0 parts per part of monomer formulation; even larger ratios may be employed where greater dilution is desired; preferably, the ratio is about 3:1. The aqueous latex formed in the emulsion polymerization of the rubber substrate may provide the aqueous medium into which the monomer formulation is incorporated, with or without additional emulsifying agents, water, etc. Alternatively, the substrate rubber may be dissolved in the monomer formulation and the mixture emulsified or a latex thereof may be separately prepared.

Various water-soluble free radical polymerization initiators are conventionally used for emulsion polymerization of the rubber monomers, including conventional peroxy and azo catalysts, and the resultant latex containing residual initiator may be used as the aqueous medium with which the interpolymer monomers are admixed. In this matter, the initiator for the rubber polymerization may function in whole or in part as the initiator for the graft polymerization. However, additional initiator may be added at the time of graft polymerization. Exemplary of suitable peroxy catalysts are the alkali metal peroxides, persulfates, perborates, peracetates and percarbonates, and hydrogen peroxide; and if so desired may be activated to form a redox system. In addition, it may be advantageous to include an oil-soluble initiator such as di-tert-butyl peroxide, benzoyl peroxide, lauroyl peroxide, oleyl peroxide, toluyl peroxide, di-tert-butyl-diperphthalate, tert-butyl peracetate, tert-butyl perbenzoate, dicumyl peroxide, tert-butyl peroxide, isopropyl peroxy dicarbonate, 2,5-dimethyl-2,5-di-(tert-butylperoxy)-hexane, 2,5-dimethyl-2,5-di(tert-butyl peroxy)-hexane-3, tert-butyl hydroperoxide, cumene hydroperoxide, p-methane hydroperoxide, cyclopentane hydroperoxide, diisopropylbenzene hydroperoxide, p-tert-butyl-cumene hydroperoxide, pinane hydroperoxide, 2,5-dimethyl-hexane-2,5-dihydroperoxide, etc., or a mixture thereof. Moreover, other means of free-radical catalysis may be employed, such as actinic radiation.

The latex of the rubbery polymer and the monomer formulations is polymerized in an inert atmosphere at temperatures in the range of 20–100° centigrade with agitation, and pressures of 0–100 p.s.i.g. may be employed. Polymerization is continued until substantially all, i.e., more than 90 percent, of the monomers have been polymerized, and the cycle will normally range from 2–10 hours and preferably 4–8 hours. Thereafter, the remaining monomer formulation or other volatile components are generally distilled from the latex, which is dewatered, washed and dried. The latex may be dewatered by spray drying, by coagulation through the addition of salts, or by other means.

The total amount of monomer formulation to be added will normally amount to 100–250 parts monomer per 100 parts total rubbery polymer, and preferably about 125–175 parts per 100 parts total rubbery polymer. The actual amount of monomer formulation added will be dependent upon the grafting efficiency of the reaction and the desired superstrate to substrate ratio for the graft copolymers formed. Although the entire amount of the monomer formulation may be present at the time that polymerization is commenced, generally it is preferable to add the monomer formulation either continuously or in increments over the major portion of the polymerization cycle, with at least some of the monomer formulation being added after the agglomerated rubber latex has been introduced into the polymerizing mixture. For example, the monomer formulation may be added over approximately ⅓–⅚ of the total polymerization cycle and, although this addition may take the form of increments of varying size, the preferred technique utilizes substantially continuous addition at a relatively constant rate over ½–¾ of the cycle. Normally, additional initiator is added incrementally or continuously over that portion of the cycle during which the monomer formulation is being added.

Particularly desirable control of an emulsion grafting reaction may be achieved in accordance with the method wherein there is admixed with the latex of the diene polymer, the polymerizable monovinylidene aromatic hydrocarbon monomer formulation, catalyst and a molecular weight regulator. The monomer is added to the latex over a period of at least four hours and at a rate to provide in the admixture not more than about 10 percent by weight, based upon the weight of the diene polymer, of unreacted monomer formulation at any time during the addition of the first 50 percent by weight of the monomer formulation. Similarly, the rate of addition is controlled during the addition of the last 50 percent by weight of the monomer so as to provide in the admixture not more than about 20 percent by weight of unrecated monomer at any time.

The catalyst is added to the latex in an amount and at rates sufficient to provide an excess of catalyst over the period of addition of at least the first 50 percent by weight of the monomer formulation and to provide catalyst for the polymerization of the monomer formulation throughout substantially the entire polymerization reaction. Since any significant excess of catalyst which will produce a residium of catalyst in the polymer is normally undesirable because of effect upon properties, the total amount of catalyst required to polymerize the monomer formulation to substantial completion is desirably determined initially. Normally, the addition of all the catalyst initially is not desirable, so that only 20 to 50 percent, and preferably 20 to 30 percent, of the total amount of catalyst is desirably charged either initially or during the addition of the first amounts of polymer. Then additional catalyst is added during the addition of monomer formulation to ensure that the proportion of catalyst added is at least 10 percent greater, and preferably at least about 15 percent greater, than the proportion of monomer formulation added during at least the addition of the first 50 percent of the monomer formulation. For example, 25 percent of the catalyst may be added to the latex before addition of the monomer formulation, and increments of 10 to 15 percent are added during the addition of each 10 to 15 percent by weight of monomer formulation, so that at least 65 percent of the catalyst has been added by the time 50 percent of the monomer formulation has been added. It is considered important that there be an excess of catalyst during the initial half of the monomer addition to ensure favoring of the grafting reaction in such an approach.

As has previously been specified, the graft ratio is of particular importance to the success of the present invention and, to avoid any ambiguity which might arise due to particle size variation, the graft ratio has been expressed in terms of weight of graft (i.e., 15–70×10⁻⁷ gram) per square centimeter of the rubber surface. The ratio for the smaller particle size range of 0.35–0.50 micron is 15–45×10⁻⁷ gram per square centimeter whereas the ratio for the large particle size range of 0.50–0.70 micron is 40–70×10⁻⁷ gram per square centimeter. To determine the weight of graft per unit of surface area of the rubber substrate, the weight of superstrate and substrate in a given amount of the polymerization blend must first be determined. This is accomplished by extracting the ungrafted matrix from the blend to determine the weight of graft copolymer that remains. It is also desirable to ensure that interpolymer occluded in the rubber particles is also extracted. The knowledge of the amount of rubber charged permits a ready determination of the quantity of superstrate and substrate by subtracting the weight of that charge from the weight of graft copolymer. The total area in square centimeters of the rubber may be determined by application of the following formula:

$$\text{Total area (sq. cm.)} = \frac{\text{Weight of rubber (g.)}}{\text{Density of rubber (g./cc.)}} \times \frac{\text{Area of particle (sq. cm.)}}{\text{Volume of particle (cc.)}}$$

The density of the rubber is a known quantity, and the weight average diameter of the substrate is utilized to determine the area and volume of the particles. Utilizing the measured weight of superstrate and the calculated area of substrate, it is possible to express the graft ratio in terms of weight of graft per square centimeter of rubber surface.

The preferred graft ratio for the graft copolymer will vary somewhat with the nature of the rubber substrate and the balance of properties ultimately desired. Generally, however, the most desirable graft copolymers have a graft density per square centimeter of rubber surface of about $25$–$45 \times 10^{-7}$ gram for the smaller range of 0.35–0.50 micron and of about $45$–$60 \times 10^{-7}$ gram for the larger range of 0.50–0.70 micron.

The polymer blend

As will be readily appreciated the rubber content of the polymer blend produced by the graft polymerization process of the present invention may be in excess of that desired for the final product since economics generally dictate the use of high rubber levels in the graft polymerization reaction. Accordingly, the graft polymerization blend resulting from the graft polymerization reaction will normally be blended with a vinylidene polymer of similar composition to increase the amount of matrix polymer and reduce the rubber level. This resinous polymer used for dilution of the graft copolymer may be produced by an emulsion process so that the latex thereof may be combined with the latex from an emulsion graft polymerization process and the mixed latex co-coagulated. Alternatively, the recovered graft copolymer may be admixed with a separately formed resinous polymer produced by emulsion, suspension or mass polymerization techniques. Generally, the final polymer blends will contain 2–50 percent by weight of the rubber component. The preferred blends contain about 7–35 percent by weight of the graft copolymer based upon rubber, and most desirably about 13–25 percent by weight thereof.

Illustrative of the efficacy of the present invention are the following specific examples, wherein all parts and percentages are by weight unless otherwise indicated.

Example 1

To a stirred reactor are charged 93.0 parts butadiene, 7.0 parts acrylonitrile, 0.4 part potassium persulfate, 0.4 part of a mixture of dodecyl mercaptans, 3.5 parts of rubber reserve soap, 0.5 part of potassium chloride, and an amount of water sufficient to provide about 64 percent of the total charge. The resulting aqueous mixture is agitated to produce a substantially homogeneous emulsion; the reactor is purged with nitrogen and then the emulsion is subjected to polymerization conditions to convert more than 95 percent of the monomers to polymer. During the polymerization cycle the temperature is maintained at about 55° centigrade; the pressure varies from an initial value of about 120 p.s.i.g. to zero p.s.i.g. at the completion of the reaction. Then the unreacted monomers are vented to the atmosphere. The particle size of rubber in the resultant latex is found to be substantially uniform at about 0.06 micron diameter, on a weight average basis.

An aqueous solution of about 2.7 parts per hundred of acetic acid anhydride is prepared by admixing the components for less than one minute, and this solution is added to the rubber latex hereinbefore obtained in an amount sufficient to provide about 0.4 part per hundred of the anhydride, based upon the latex. The anhydride solution and latex are stirred for less than one minute to effect homogeneous distribution and thereafter the admixture is maintained quiescent for about 30 minutes at ambient temperature. To the resulting agglomerized latex is added about 3.0 parts per hundred of a 10.0 percent aqueous solution of the sodium salt of a long chain sulfonic acid anionic emulsifying agent sold by Rohm & Haas Co. of Philadelphia, Pa., under the trademark Triton X-200, and admixture is effected by stirring very slowly so as to avoid coagulation. The weight average particle size in the agglomerated and stabilized latex is observed to be about 0.35 micron, representing about a six-fold increase therein, and it is "monodisperse" as hereinbefore defined.

Half of the agglomerated latex is placed in each of two reactors, and to each is added about 0.25 part of potassium persulfate and about 150 parts of water. After purging the reactors with nitrogen and heating to 70° centigrade, the pH of the latex is adjusted to 8.5 with potassium hydroxide, thereby neutralizing the acid formed and regenerating free soap. For addition to one portion of the latex, a mixture (A) containing 0.75 part of terpinolene (chain transfer agent) and 75.0 parts of a polymerizable styrene/acrylonitrile (70:30) monomer formulation is made; a similar mixture (B), containing, however, twice as much terpinolene, is made for addition to the second portion of the latex.

During a period of six hours, the respective mixtures of monomer formulations are continuously added to the reactors, along with an additional charge of 0.5 part of potassium persulfate (as a 4.0 percent solution), which is also added continuously. The temperature in the reactors is maintained at about 70° centigrade until the polymerization cycle is about 75 percent complete, and thereafter the temperature is held at about 75° centigrade. The prevailing pressure is ambient, and the total cycle time is approximately 8 hours. After the first 3 hours of the cycle an additional charge of about 0.5 part of rubber reserve soap is made to the polymerizing mixture in each of the reactors, and a like amount is added after an additional hour's time.

At the completion of the reaction cycle, each of the reactors is vented, and antioxidants and stabilizers are added. The latices are then coagulated, washed and dried to provide graft copolymer blends. In each instance, the styrene/acrylonitrile copolymer phase has an intrinsic viscosity in dimethyl formamide at 25° centigrade of about 0.40, which is taken as an accurate measure of the molecular weight (chain length) of the graft superstrate. The polymerization product of each mixture is diluted to a 23.0 percent rubber concentration with an appropriate amount of a styrene/acrylonitrile (70:30) copolymer having an intrinsic viscosity of about 0.6, and the blends are injection molded to provide suitable specimens for testing. The blends and the molded specimens are found to have the following properties.

TABLE 1

| Mixture for specimen | Graft level (g./sq. cm.) | Impact strength Izod (ft. lbs./in. notch) | Impact strength Falling dart (0° F.) (ft. lbs.) | Gloss, Hunter peak | Smudging |
|---|---|---|---|---|---|
| A | $21.2 \times 10^{-7}$ | 5.5 | 61 | 87 | [1] 540/2 |
| B | $22.2 \times 10^{-7}$ | 6.8 | 52 | 81 | [2] 10/4 |

[1] The first value is the lowest injection pressure (p.s.i.) on a Watson-Stillman machine at which a surface "smudge" defect is observed in the specimen; the second value is the length (millimeters) of the smudge produced at an injection pressure of 800 p.s.i.

[2] The first value represents the length (millimeters) of the smudge caused on an Arburg molding machine by filling the mold cavity in 0.6 second; the second value is the minimum fillage time (seconds) at which no smudging will result.

These impact strength measurements and gloss determinations are indicative of the very desirable balance of properties that may be attained in ABS ployblends prepared in accordance with the present invention. Moreover, the smudge values are substantially the same or better than those exhibited by commercially available ABS resins, and the modulus and tensile strength values are also desirable.

Example 2

The procedure of Example 1 is substantially repeated. However, the initial rubber particles are of about 0.05 micron and are agglomerated to about 0.6 micron and the agglomearted latex is stabilized with 2.0 parts, per 100 parts of rubber, of disodium 4-dodecylated oxydibenzene sulfonate.

To the stabilized rubber latex containing 100 parts rubber solids is added over a period of three hours a mixture of 60 parts of a 70/30 styrene/acrylonitrile monomer mixture and 0.8 part of terpinolene. In equal increments at 0, 1 and 2 hours from the beginning of the cycle is added 0.3 part potassium persulfate initiator. The temperature in the reactor is 80° centigrade and the reaction mixture is held at temperature for 1½ hours after completion of the monomer addition. The latex is then coagulated, and the crumb is washed and dried. Thereafter, the crumb is blended with styrene/acrylonitrile interpolymer to various rubber levels and the mixtures are extruded and molded to provide test specimens.

Upon testing, the following physical properties are determined.

|  | 11.5% rubber | 23% rubber |
|---|---|---|
| Izod impact, ft. lbs./in notch | 2.1 | 6.2 |
| Gloss, Hunter, peak | 83 | 78 |
| Shrinkage, percent | 11 | 7 |
| Falling dart, impact, 0° F., ft. lbs | [1] 17 | [2] 45 |

[1] At room temperature.
[2] At 0° F.

Thus, it can be seen that the present invention provides a novel polyblend of rubber with an interpolymer consisting at least principally of a monovinylidene aromatic hydrocarbon and an ethylenically unsaturated nitrile, and which exhibits a highly desirable balance of properties. The polyblend has a high level of impact resistance, good surface characteristics, and other desirable properties. The process is facile and relatively economical, and it permits existing equipment and techniques to be utilized for the preparation of such graft polyblends.

What is claimed is:

1. A method of making a polyblend consisting essentially of:
    (a) polymerizing an emulsified diene monomer formulation to obtain a latex of rubbery polymer selected from the group consisting of diene rubbers, ethylene-propylene-diene terpolymer rubbers and acrylate-diene copolymer rubbers and having an average particle size of less than 0.15 micron (weight average);
    (b) agglomerating said rubbery polymer of said latex by addition of a water soluble organic acid anhydride to produce a latex of a rubber substrate having a weight average particle size within the range of about 0.35–0.70 micron, the particles of said substrate being substantially monodisperse in size with at least 70.0 weight percent thereof being within 0.05 micron of said weight average size; and
    (c) polymerizing, in the presence of said agglomerated rubber substrate latex as essentially the sole rubber component and a molecular weight regulator, a polymerizable monomer formulation consisting at least principally of a monovinylidene aromatic hydrocarbon and an ethylenically unsaturated nitrile, the weight ratio of said monomer formulation and rubber substrate being about 100–250:100, the conditions of polymerization and the amount of said molecular weight regulator producing grafting of a part of said monomer formulation onto said agglomerated rubber substrate to provide about $15\text{--}45 \times 10^{-7}$ gram of superstrate per square centimeter of substrate surface when said substrate is of a particle size of about 0.35–0.50 micron and about $40\text{--}70 \times 10^{-7}$ gram of superstrate per square centimeter of substrate surface when said substrate is of a particle size of about 0.50–0.70 micron and a molecular weight for said superstrate represented by an intrinsic viscosity of 0.35–0.60 in dimethyl formamide at 25° centigrade, thereby producing a polyblend in which said grafted agglomerated rubber substrate is essentially the sole rubber component.

2. The method of claim 1 wherein said monovinylidene aromatic hydrocarbon is styrene and said unsaturated nitrile is acrylonitrile.

3. The method of claim 1 wherein said diene monomer formulation contains at least 75 percent by weight butadiene.

4. The method of claim 3 wherein said diene monomer formulation comprises butadiene and acrylonitrile.

5. The method of claim 3 wherein said rubbery polymer is agglomerated by addition of a water-soluble acid anhydride thereto.

6. The method of claim 1 wherein the molecular weight regulator is present in an amount of about 1.0–1.5 moles per 100 moles of polymerizable monomer formulation.

7. The method of claim 3 wherein said monovinylidene aromatic hydrocarbon and unsaturated nitrile comprise at least 75.0 percent by weight of the interpolymers of the graft copolymer superstrate and matrix.

8. The method of claim 7 wherein said agglomerated particles have a size of 0.4–0.6 micron and wherein the amount of said superstrate is $25\text{--}45 \times 10^{-7}$ gram and $45\text{--}60 \times 10^{-7}$ gram per square centimeter of substrate surface, when the substrate is of a particle size, respectively, of about 0.4–0.5 and 0.5–0.6 micron.

9. A composition consisting essentially of a polyblend of:
    (a) a matrix of an interpolymer consisting at least principally of a monovinylidene aromatic hydrocarbon and an ethylenically unsaturated nitrile;
    (b) a graft copolymer having a graftable rubber substrate containing a diene monomer component selected from the group consisting of diene rubbers, ethylene-propylene-diene terpolymer rubbers and acrylate-diene copolymer rubbers and a superstrate of an interpolymer consisting at least principally of a monovinylidene aromatic hydrocarbon and an ethylenically unsaturated nitrile, said rubber substrate having a weight average particle size within the range of 0.35–0.70 micron, the particles of said rubber substrate being substantially monodisperse in size with at least about 70.0 weight percent thereof being within 0.05 micron of said weight average size, said graft copolymer having $15\text{--}45 \times 10^{-7}$ gram of superstrate per square centimeter of substrate surface when said substrate is of a particle size of about 0.35–0.50 micron and about $40\text{--}70 \times 10^{-7}$ gram of superstrate per square centimeter of substrate surface when said substrate is of a particle size of about 0.50–0.70 micron and the molecular weight of said superstrate being represented by an intrinsic viscosity of 0.35–0.60 in dimethyl formamide at 25° centigrade.

10. The composition of claim 9 wherein said monovinylidene aromatic hydrocarbon is styrene and said unsaturated nitrile is acrylonitrile.

11. The composition of claim 9 wherein said rubber substrate contains at least 75.0 percent by weight butadiene.

12. The composition of claim 11 wherein said rubber substrate comprises a butadiene/acrylonitrile copolymer.

References Cited

UNITED STATES PATENTS

| 3,509,238 | 4/1970 | Aubrey et al. | 260—876 R |
| 3,558,541 | 1/1971 | Dalton | 260—880 R |

MURRAY TILLMAN, Primary Examiner
J. ZIEGLER, Assistant Examiner

U.S. Cl. X.R.

260—23.7 A, 29.7 UP, PT, 878 R, 879, 880 R, 884